(12) United States Patent
Li et al.

(10) Patent No.: US 10,789,938 B2
(45) Date of Patent: Sep. 29, 2020

(54) SPEECH SYNTHESIS METHOD TERMINAL AND STORAGE MEDIUM

(71) Applicant: BAIDU ONLINE NETWORK TECHNOLOGY (BEIJING) CO., LTD., Beijing (CN)

(72) Inventors: Hao Li, Beijing (CN); Yongguo Kang, Beijing (CN)

(73) Assignee: BAIDU ONLINE NETWORK TECHNOLOGY (BEIJING) CO., LTD, Beijing (CN)

(*) Notice: Subject to any disclaimer, the term of this patent is extended or adjusted under 35 U.S.C. 154(b) by 131 days.

(21) Appl. No.: 16/099,257

(22) PCT Filed: Sep. 5, 2016

(86) PCT No.: PCT/CN2016/098126
§ 371 (c)(1),
(2) Date: Nov. 6, 2018

(87) PCT Pub. No.: WO2017/197809
PCT Pub. Date: Nov. 23, 2017

(65) Prior Publication Data
US 2019/0213995 A1   Jul. 11, 2019

(30) Foreign Application Priority Data

May 18, 2016  (CN) .......................... 2016 1 0329738

(51) Int. Cl.
*G10L 13/047*  (2013.01)
*G10L 13/06*  (2013.01)
(Continued)

(52) U.S. Cl.
CPC .............. *G10L 13/08* (2013.01); *G06F 40/30* (2020.01); *G10L 13/0335* (2013.01);
(Continued)

(58) Field of Classification Search
CPC ... G10L 13/08; G10L 13/0335; G10L 13/043; G10L 13/047; G10L 13/086; G06F 40/30
(Continued)

(56) References Cited

U.S. PATENT DOCUMENTS 9,798,653 B1 * 10/2017 Shao ....................... G06F 40/00
10,137,902 B2 * 11/2018 Juneja ..................... G06F 3/167
(Continued)

FOREIGN PATENT DOCUMENTS

CN        105845125 A      8/2016

OTHER PUBLICATIONS

PCT/CN2016/098126 English translation of International Search Report dated Feb. 24, 2017, 2 pages.
(Continued)

*Primary Examiner* — Edwin S Leland, III
(74) *Attorney, Agent, or Firm* — Lathrop GPM LLP (57) ABSTRACT

A speech synthesis method and device. The method comprises: determining language types of a statement to be synthesized; determining base models corresponding to the language types; determining a target timbre, performing adaptive transformation on the spectrum parameter models based on the target timbre, and training the statement to be synthesized based on the spectrum parameter models subjected to adaptive transformation to generate spectrum parameters; training the statement to be synthesized based on the fundamental frequency parameters to generate fundamental frequency parameters, and adjusting the fundamental frequency parameters based on the target timbre; and synthesizing the statement to be synthesized into a target speech based on the spectrum parameters, and the fundamental frequency parameters after adjusting.

18 Claims, 4 Drawing Sheets

(51) Int. Cl.
  *G06F 17/28* (2006.01)
  *G10L 13/08* (2013.01)
  *G10L 13/033* (2013.01)
  *G06F 40/30* (2020.01)
  *G10L 13/04* (2013.01)
(52) U.S. Cl.
  CPC .......... *G10L 13/043* (2013.01); *G10L 13/047* (2013.01); *G10L 13/086* (2013.01)
(58) Field of Classification Search
  USPC ........................................................ 704/260
  See application file for complete search history.

(56) References Cited

U.S. PATENT DOCUMENTS

| | | | |
|---|---|---|---|
| 10,319,365 B1* | 6/2019 | Nicolis | G10L 13/10 |
| 2008/0312913 A1* | 12/2008 | Goto | G10G 3/04 |
| | | | 704/207 |
| 2012/0173241 A1* | 7/2012 | Li | G10L 13/10 |
| | | | 704/260 |
| 2015/0012279 A1* | 1/2015 | Kim | G10L 15/22 |
| | | | 704/275 |
| 2017/0047060 A1* | 2/2017 | Liu | G10L 13/10 |
| 2019/0213995 A1* | 7/2019 | Li | G10L 13/08 |
| 2020/0044999 A1* | 2/2020 | Wu | G10L 25/63 |
| 2020/0058288 A1* | 2/2020 | Lin | G06F 9/451 |

OTHER PUBLICATIONS

PCT/CN2016/098126 International Search Report and Written Opinion dated Feb. 24, 2017, 8 pages.

\* cited by examiner

SPEECH SYNTHESIS METHOD TERMINAL AND STORAGE MEDIUM

CROSS-REFERENCE TO RELATED APPLICATIONS

This application is U.S. national phase of International application PCT/CN2016/098126, which claims priority to Chinese Patent Application No. 201610329738.1, titled with "speech synthesis method and speech synthesis device" and filed on May 18, 2016 by Baidu Online Network Technology (Beijing) CO., LTD.

FIELD

The present disclosure relates to a field of speech synthesis technologies, and more particularly to a speech synthesis method, a speech synthesis device, a terminal and a storage medium.

BACKGROUND

With the development and popularization of speech synthesis technologies, a speech synthesis service is increasingly accepted and used by users. Most users are multilingual, and speech synthesis is increasingly applied to multilingual occasions. Therefore, multilingual speech synthesis is needed, particularly Chinese-English speech synthesis. It is usual requirements for the users in multilingual speech synthesis that a synthesized speech is understandable, has accurate pronunciation, and has natural and uniform timbre. Thus, it has become a technical problem in speech synthesis how to synthesize a natural, accurate, and uniform timbre multilingual speech when speech synthesis has basically solved on understandability in the related art.

SUMMARY

Embodiments of the present disclosure provide a speech synthesis method, including: determining language types of text information of a statement to be synthesized, in which, the language types include a first language type and a second language type; determining a first base model corresponding to the first language type and a second base model corresponding to the second language type, in which, the first base model includes a first spectrum parameter model and a first fundamental frequency parameter model, and the second base model includes a second spectrum parameter model and a second fundamental frequency parameter model; determining a target timbre, performing adaptive transformation on the first spectrum parameter model and the second spectrum parameter model based on the target timbre, and training the text information of the statement to be synthesized based on the first spectrum parameter model subjected to adaptive transformation and the second spectrum parameter model subjected to adaptive transformation to generate a spectrum parameter corresponding to the first language type and a spectrum parameter corresponding to the second language type; training the text information of the statement to be synthesized based on the first fundamental frequency parameter model and the second fundamental frequency parameter model to generate a fundamental frequency parameter corresponding to the first language type and a fundamental frequency parameter corresponding to the second language type, and adjusting the fundamental frequency parameter corresponding to the first language type and the fundamental frequency parameter corresponding to the second language type based on the target timbre; and synthesizing the text information of the statement to be synthesized into a target speech based on the spectrum parameter corresponding to the first language type, the spectrum parameter corresponding to the second language type, the fundamental frequency parameter corresponding to the first language type after adjusting and the fundamental frequency parameter corresponding to the second language type after adjusting.

Embodiments of the present disclosure provide a terminal, including: one or more processors, a memory and one or more programs. The one or more programs are stored in the memory. When the one or more programs are executed by the one or more processors, the one or more programs are configured to execute the above method.

Embodiments of the present disclosure provide a storage medium. The storage medium is configured to store applications and the applications are configured to execute the above method.

Additional aspects and advantages of embodiments of the present disclosure will be given in part in the following descriptions, and become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Description will be made in detail below to embodiments of the present disclosure. Examples of embodiments are illustrated in the accompanying drawings, in which, the same or similar numbers represent the same or similar elements or elements with the same or similar functions throughout the description. Embodiments described below with reference to the accompanying drawings are exemplary, which are intended to explain the present disclosure and do not be understood a limitation of the present disclosure.

It should be understood that, in daily life, a multilingual speech synthesis application has gradually been needed by people, for example, taking a news application in a mobile terminal as an example, when a user uses the news application to hear news by a speech synthesis function, news contents, especially science and technology news, in addition to Chinese characters, there is a large amount of English words. Therefore, this application is a typical multilingual speech synthesis. However, naturalness, accuracy, and timbre uniformity of the synthesized speech will have an impact on user experience. Therefore, the present disclosure provides a speech synthesis method and device, to effectively solve problems of pronunciation accuracy and uniform timbre. In detail, the speech synthesis method and the speech synthesis device provided in the embodiments of the present disclosure are described below with reference to the accompanying drawings.

In the related art, when it relates to multilingual speech synthesis, modeling is based on data of different mother tongue speakers in different languages or data of the same speaker with standard pronunciation in various languages.

However, problems in the related art are the following. (1) The method based on data of different mother tongue speakers in different languages may result in the uniform timbre, to affect naturalness of speech synthesis and user experience; (2) On the method based on data of the same speaker with standard pronunciation in various languages, most speakers has accents on other languages in addition to mother tongue, and have a large difference with the mother tongue speaker on other languages, which reduces user experience; the synthesized speech based on this data may be not standard in other languages in addition to mother tongue of the speaker; and further a standard speaker in a plurality of languages is usually professional, and thus the cost of data collection is higher.

Therefore, it has been an urgent problem to be solved how to reduce the cost and efficiently synthesize multilingual texts into the natural, accurate and uniform timbre multilingual speech.

Figure 1:
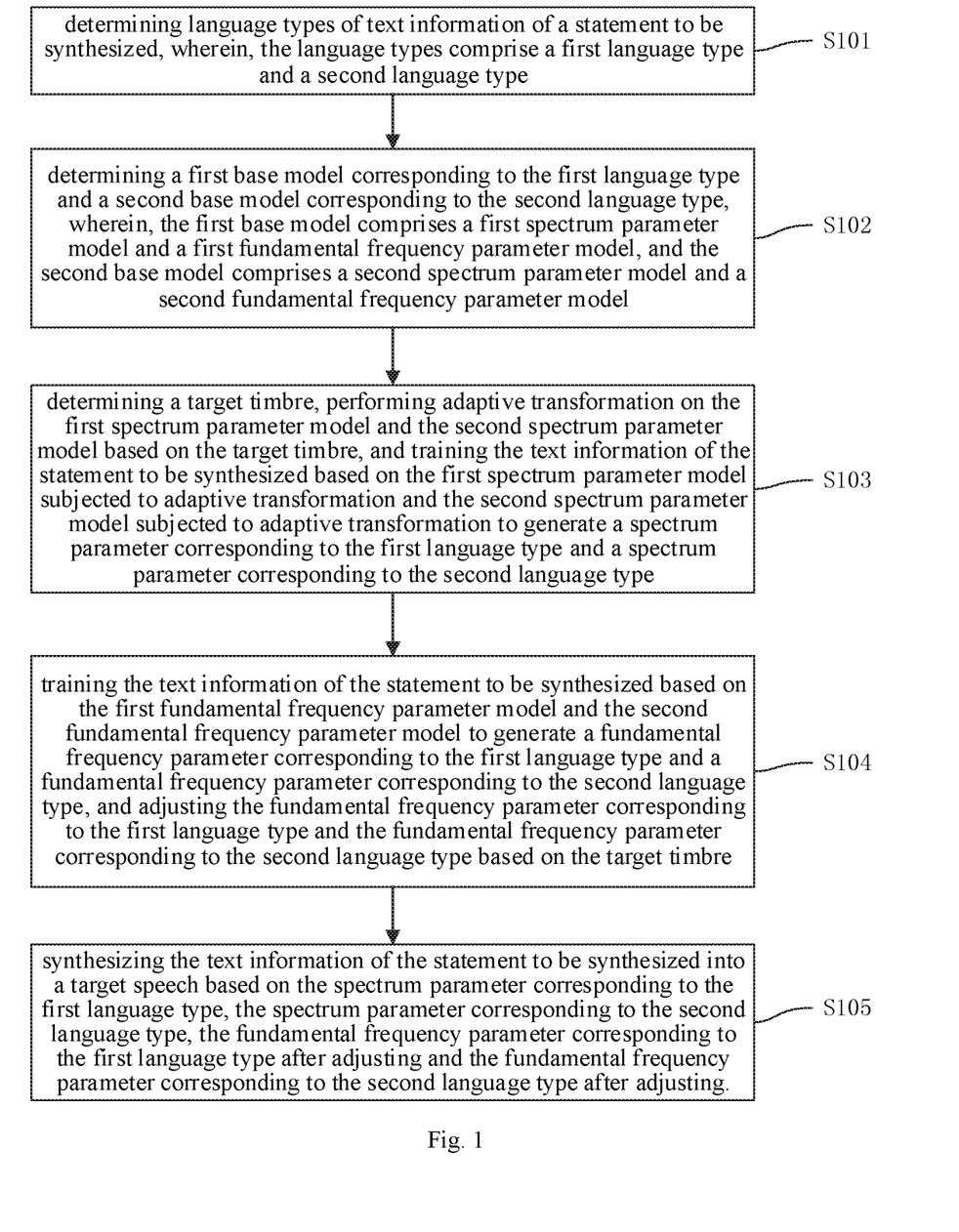
FIG. 1 is a flow chart illustrating a speech synthesis method according to an embodiment of the present disclosure.

FIG. 1 is a flow chart illustrating a speech synthesis method according to an embodiment of the present disclosure. It should be noted that, the speech synthesis method provided in the embodiments of the present disclosure may be applicable to an electronic device having speech synthesis function, such as a mobile terminal (such as a phone, a table computer and a personal digital assistant), a terminal (such as a PC (Personal Computer)). In addition, the speech synthesis method provided in the embodiments of the present disclosure is applicable to a scene that text in a plurality of languages is synthesized into a speech in the plurality of languages.

As illustrated in FIG. 1, the speech synthesis method includes actions in the following blocks.

In block S101, language types of text information of a statement to be synthesized is determined, in which, the language types include a first language type and a second language type.

In detail, the text information of the statement to be synthesized may be obtained firstly, and the text information of the statement to be synthesized may be understood as text contents of the statement to be synthesized. And then language discrimination is performed on the text information of the statement to be synthesized, to determine the language types of text contents in the text information of the statement to be synthesized.

As an example, sentence segmentation is performed on the text contents in the text information of the statement to be synthesized according to language characters and contextual content information, to determine a language type of each sentence segment. The language type may include the first language type and the second language type(s). There may be one or more second language types. Namely, the language types of the text information of the statement to be synthesized may be two language types, and further may be three or more language types.

In block S102, a first base model corresponding to the first language type is determined and a second base model corresponding to the second language type is determined, in which, the first base model includes a first spectrum parameter model and a first fundamental frequency parameter model, and the second base model includes a second spectrum parameter model and a second fundamental frequency parameter model.

In detail, after determining the language types of the text information of the statement to be synthesized, the language base models corresponding to the language types may be determined. For example, taking that the statement to be synthesized include text contents mixing Chinese and English as an example, it may be determined that the language types of the statement mixing Chinese and English includes a Chinese language type and an English language type, and then a Chinese base model corresponding to the Chinese language type and an English base model corresponding to the English language type may be determined.

It should be understood that, each language base model may include an HMM (Hidden Markov Model) related to context and a state clustering decision tree corresponding to the HMM. Each state of the HMM represents a gaussian model, and effect of the decision tree is to cluster training data, to enable that each state may obtain enough training data.

It should be noted that, the first base model above may be understood to be established by using speech data of a trained speaker taking the first language type as mother tongue, and this trained speaker may speak the second language. However, pronunciation standard of the second language of this trained speaker is not required. The second base model above may be understood to be established by using speech data of the trained speaker taking the second language type as mother tongue, and this trained speaker may speak the first language. However, pronunciation standard of the first language of this trained speaker is not required.

Namely, when a multilingual speech synthesis model is trained, there is no need to require that certain people have very standard bilingual pronunciation. As long as one pronunciation of the bilingual pronunciation is standard, and base models of other languages may be trained by using data of other people whose pronunciation is standard. Thus, the dependence on professional multilingual speaker data may be reduced in multilingual speech synthesis, and more monolingual data is used to reduce the data cost and implementation difficulty.

In block S103, a target timbre is determined, and adaptive transformation is performed on the first spectrum parameter model and the second spectrum parameter model based on the target timbre, and the text information of the statement to be synthesized is trained based on the first spectrum parameter model subjected to adaptive transformation and the second spectrum parameter model subjected to adaptive transformation to generate a spectrum parameter corresponding to the first language type and a spectrum parameter corresponding to the second language type.

It should be understood that, in embodiments of the present disclosure, there may be a plurality of methods for determining the target timbre, for example, a type of mother tongue of the user is determined as the target timbre, and a language type chosen in a language setting of an electronic device (such as a mobile terminal and a terminal) used by the user is determined as the target timbre, which will not be exemplified herein As an example, a detailed implementation procedure of determining the target timbre is as follows. User information (such as a user name or an account name) of the user is obtained, and a type of the mother tongue of the user is determined based on the user information, in which, the type of the mother tongue is included in the language types; a timbre of the trained speaker corresponding to a base model of the type of the mother tongue of the user is taken as the target timbre. For example, user information of user A is obtained, and it is determined that a type of mother tongue of user A is Chinese based on the user information, and a timbre of the trained speaker corresponding to a base model (that is, a Chinese base model) of the mother tongue Chinese of user A is taken as the target timbre at this time.

After determining the target timbre, the adaptive transformation is performed on the first spectrum parameter model and the second spectrum parameter model, to generate spectrum parameters with the same or similar timbres after applying the first spectrum parameter model subjected to adaptive transformation and the second spectrum parameter model subjected to adaptive transformation. Namely, after determining the target timbre, the adaptive training is performed on the first base model and the second base model based on the target timbre, such that the spectrum parameters generated by using the first base model subjected to adaptive training and the second base model subjected to adaptive training are same or similar. Detailed implementation methods of the adaptive transformation may refer to description of embodiments below.

In block S104, the text information of the statement to be synthesized is trained based on the first fundamental frequency parameter model and the second fundamental frequency parameter model to generate a fundamental frequency parameter corresponding to the first language type and a fundamental frequency parameter corresponding to the second language type, and the fundamental frequency parameter corresponding to the first language type and the fundamental frequency parameter corresponding to the second language type are adjusted based on the target timbre.

In detail, the text to be synthesized corresponding to respective language type in the text information of the statement to be synthesized is trained based on the first fundamental frequency parameter model and the second fundamental frequency parameter model, to generate the fundamental frequency parameter corresponding to the text to be synthesized of the first language type and the fundamental frequency parameter corresponding to the text to be synthesized of the second language type. After generating the fundamental frequency parameters, the fundamental frequency parameter corresponding to the first language type and the fundamental frequency parameter corresponding to the second language type may be adjusted based on the target timbre, for example, a global mean and a variance of fundamental frequency curve in the fundamental frequency parameter corresponding to the first language type and a global mean and a variance of fundamental frequency curve in the fundamental frequency parameter corresponding to the second language type are uniformly adjusted to be the same with a global mean and a variance of fundamental frequency curve in the fundamental frequency parameter corresponding to the target timbre, such that speech timbre obtained by the first base model and speech timbre obtained by the second base model are unified to be the target timbre, ensuring to synthesize the multilingual text into the uniform timbre multilingual speech.

In block S105, the text information of the statement to be synthesized is synthesized into a target speech based on the spectrum parameter corresponding to the first language type, the spectrum parameter corresponding to the second language type, the fundamental frequency parameter corresponding to the first language type after adjusting and the fundamental frequency parameter corresponding to the second language type after adjusting.

As an example, the spectrum parameter corresponding to the first language type, the spectrum parameter corresponding to the second language type, the fundamental frequency parameter corresponding to the first language type after adjusting and the fundamental frequency parameter corresponding to the second language type after adjusting are synthesized to the target timbre by a vocoder. It should be understood that, the target timbre is multilingual speech.

With the speech synthesis method provided in embodiments of the present disclosure, firstly, the language types of the text information of the statement to be synthesized are determined, in which, the language types include the first language type and the second language type, and then the first base model corresponding to the first language type is determined and the second base model corresponding to the second language type is determined, and then the target timbre is determined, and the adaptive transformation is performed on the first base model and the second base model based on the target timbre, and the text information of the statement to be synthesized is trained based on the first base model subjected to adaptive transformation and the second base model subjected to adaptive transformation to generate the spectrum parameter and the fundamental frequency parameter corresponding to the first language type and the spectrum parameter and the fundamental frequency parameter corresponding to the second language type, and then the fundamental frequency parameter corresponding to the first language type and the fundamental frequency parameter corresponding to the second language type are adjusted based on the target timbre, finally, the text information of the statement to be synthesized is synthesized into the target speech based on the spectrum parameter corresponding to the first language type, the spectrum parameter corresponding to the second language type, the fundamental frequency parameter corresponding to the first language type after adjusting and the fundamental frequency parameter corresponding to the second language type after adjusting. That is, language types included in the statement to be synthesized are determined, and the adaptive training is performed on the spectrum parameter of respective language type based on the target timbre, and the spectrum parameter corresponding to respective language type may be generated by employing the corresponding spectrum parameter model subjected to adaptive training, and the generated fundamental frequency parameter of respective language type is adjusted based on the target timbre, to obtain an uniform timbre multilingual speech. It should be understood that, the language base models used above are built by monolingual data, which reduce the data cost and implementation difficulty in establishing the models and decrease the dependence of multilingual speech synthesis on the professional multilingual speaker data, and may effectively synthesize the multilingual statement text into the natural, accurate and uniform timbre multilingual speech, improving user experience.

Figure 2:
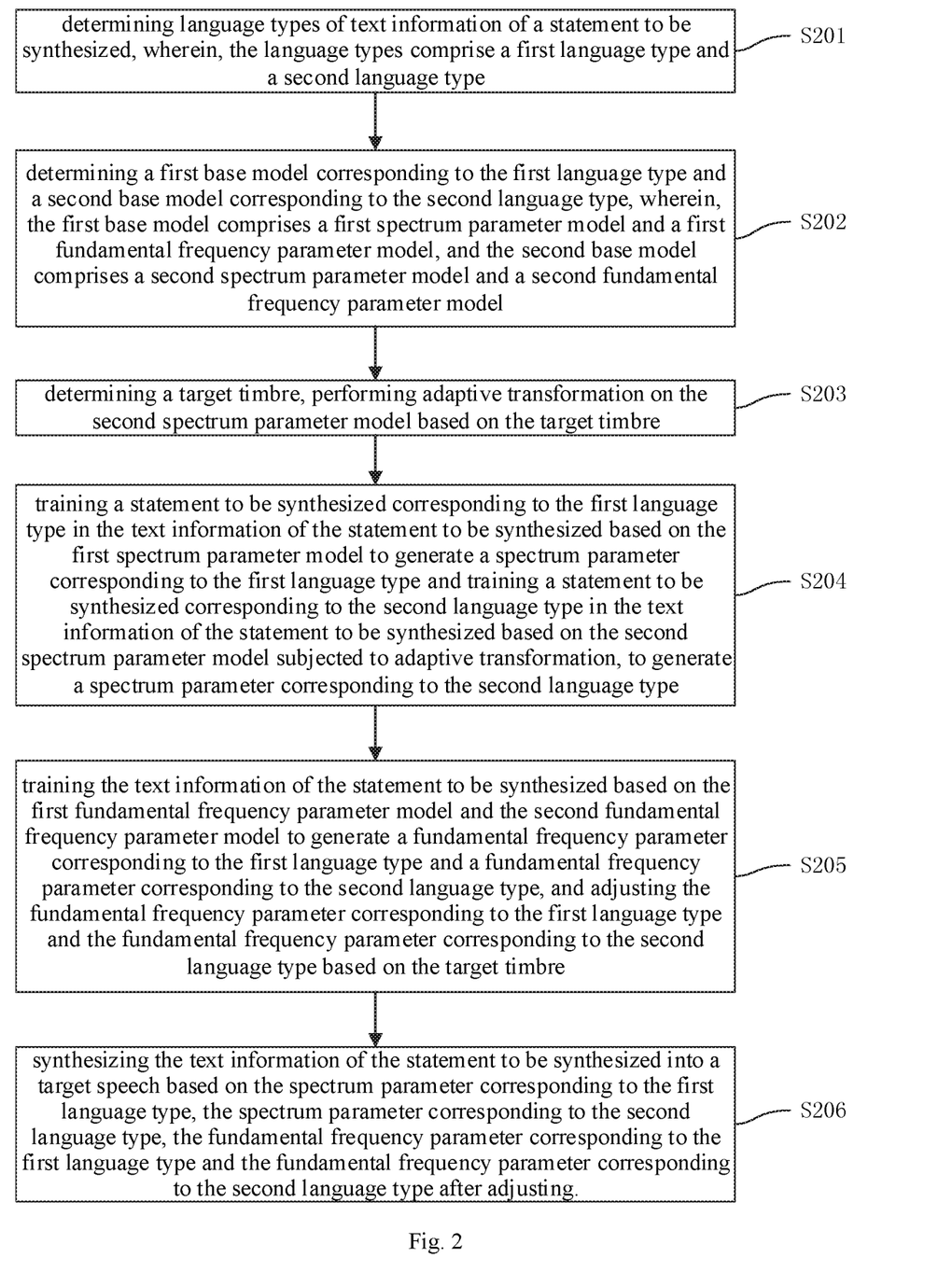
FIG. 2 is a flow chart illustrating a speech synthesis method according to a detailed embodiment of the present disclosure.

FIG. 2 is a flow chart illustrating a speech synthesis method according to a detailed embodiment of the present disclosure.

It should be understood that, the target timbre may be the timbre of the speaker to which the user prefers, for example, the target timbre may be the timbre of the trained speaker corresponding to the first base model, or may be the timbre of the trained speaker corresponding to the second base model.

In embodiments of the present disclosure, taking that the target timbre is the timbre of the trained speaker corresponding to the first base model as an example, as illustrated in FIG. 2, when the target timbre is the timbre of the trained speaker corresponding to the first base model, the speech synthesis method may include actions in the following blocks.

In block S201, the language types of text information of the statement to be synthesized is determined, in which, the language types include a first language type and a second language type.

In block S202, the first base model corresponding to the first language type is determined and the second base model corresponding to the second language type is determined, in which, the first base model includes the first spectrum parameter model and the first fundamental frequency parameter model, and the second base model includes the second spectrum parameter model and the second fundamental frequency parameter model.

In block S203, the target timbre is determined, and the adaptive transformation is performed on the second spectrum parameter model based on the target timbre.

It should be understood that, when the target timbre is determined to be the timbre of the trained speaker corresponding to the first base model, namely, the parameters generated by the second base model is adjusted to be the same with the timbre of the trained speaker corresponding to the first base model, the first base model may be used directly for parameter generation without adaptive training.

As an example, when the target timbre is determined to be the timbre of the trained speaker corresponding to the first base model, training speech data of the trained speaker corresponding to the first base model for the second language type may be obtained, and the adaptive transformation is performed on the second spectrum parameter model according to the training speech date of the trained speaker corresponding to the first base model for the second language type. It should be understood that, the adaptive transformation of the spectrum parameter model is finished before parameter generation.

In detail, when the training speech data of the trained speaker corresponding to the first base model for the second language type (for example including the training statements of the second language type and annotations thereof) is obtained, the training speech date of the trained speaker corresponding to the first base model for the second language type may be as input of the decision tree of the second spectrum parameter model for clustering, to obtain training data of each state, and a transformation matrix is estimated for an HMM state of each spectrum parameter by the training data of each state, such that a state Gaussian model after the transformation matrix can be applied subsequently to generate the spectrum parameter similar to the trained speaker of the first language type.

In block S204, the statement to be synthesized corresponding to the first language type in the text information of the statement to be synthesized is trained based on the first spectrum parameter to generate the spectrum parameter corresponding to the first language type, and the statement to be synthesized corresponding to the second language type in the text information of the statement to be synthesized is trained based on the second spectrum parameter model subjected to adaptive transformation, to generate the spectrum parameter corresponding to the second language type.

In detail, when the target timbre is determined to be the timbre of the trained speaker corresponding to the first base model, the statement to be synthesized corresponding to the first language type in the text information of the statement to be synthesized is trained directly based on the first spectrum parameter model, to generate the spectrum parameter corresponding to the first language type. For the statement to be synthesized corresponding to the second language type, the statement to be synthesized corresponding to the second language type is trained based on the second spectrum parameter model subjected to adaptive transformation, to generate the spectrum parameter corresponding to the second language type.

In block S205, the text information of the statement to be synthesized is trained based on the first fundamental frequency parameter model and the second fundamental frequency parameter model to generate a fundamental frequency parameter corresponding to the first language type and a fundamental frequency parameter corresponding to the second language type, and the fundamental frequency parameter corresponding to the second language type is adjusted based on the target timbre.

In detail, a statement to be synthesized corresponding to respective language type in the text information of the statement to be synthesized is trained based on the first fundamental frequency parameter model or the second fundamental frequency parameter model, to generate a fundamental frequency parameter corresponding to respective language type, that is, the fundamental frequency parameter corresponding to the first language type and the fundamental frequency parameter corresponding to the second language type.

It should be understood that, when the target timbre is determined to be the timbre of the trained speaker corresponding to the first base model, the fundamental frequency parameter corresponding to the first language type may not be adjusted, and the fundamental frequency parameter corresponding to the second language type is adjusted only.

As an example, a detailed implementation procedure of adjusting the fundamental frequency parameter corresponding to the second language model based on the target timbre may include the following. The training speech data of the trained speaker corresponding to the first base model for the second language type may be obtained firstly, and then the second fundamental frequency parameter model is trained based on the training speech data of the trained speaker corresponding to the first base model for the second language type, to generate a fundamental frequency parameter of a target speaker corresponding to the target timbre, finally, the fundamental frequency parameter corresponding to the second language type is adjusted based on the fundamental frequency parameter of the target speaker.

It should be understood that, the adjusting of the fundamental frequency parameter is realized after parameter generation. When the target timbre is determined to be the timbre of the trained speaker corresponding to the first base model, the training speech data of the trained speaker corresponding to the first base model for the second language type (for example including the training statements of the second language type and annotations thereof) is obtained firstly. The training speech data is taken as input of the decision tree of the second fundamental frequency parameter model for clustering, to obtain the training data of each state, and the HMM state of each fundamental frequency is trained by the training data of each state, to obtain the Gaussian parameter of the HMM state, which is called the fundamental frequency model of the target speaker. During synthesis, parameter generation is performed by the fundamental frequency parameter model of the target speaker, and the global mean and the variance of the fundamental frequency carve generated are calculated and are saved. Then, fundamental frequency parameter generation is generated by the second base model, and linear transformation is performed on the fundamental frequency cave generated, to enable the global mean and the variance of this fundamental frequency cave generated to be transformed to be the same with the global mean and the variance of the fundamental frequency generated by the fundamental frequency parameter model of the target speaker, finishing the adjustment of the fundamental frequency carve.

In block S206, the text information of the statement to be synthesized is synthesized into a target speech based on the spectrum parameter corresponding to the first language type, the spectrum parameter corresponding to the second language type, the fundamental frequency parameter corresponding to the first language type and the fundamental frequency parameter corresponding to the second language type after adjusting.

It should be understood that, the timbre of the second language speech is transformed into the timbre of the trained speaker corresponding to the first base model by adaption and fundamental frequency parameter adjusting, and the original duration and intonation information of the second language speech is maintained, such that the second language speech of the trained speaker corresponding to the original first base model of which the pronunciation is not standard is changed to be closed to the pronunciation of the trained speaker corresponding to the second base model.

To enable the skilled in the art to more clearly understand the present disclosure, the method of the present disclosure is described below by taking synthesizing the Chinese language and English language speech, and unifying the timbre of a Chinese speaker as an example.

For example, it is assumed that the first base model is a Chinese base model, and the second base model is an English base model. It is assumed that the Chinese base model is established by using bilingual speech data of a Chinese-English bilingual speaker taking Chinese as mother tongue, and the English base model is established by using English speech data of a speaker taking English as mother tongue, in which, English pronunciation standard of the speaker taking Chinese as mother tongue is not required.

Figure 3:
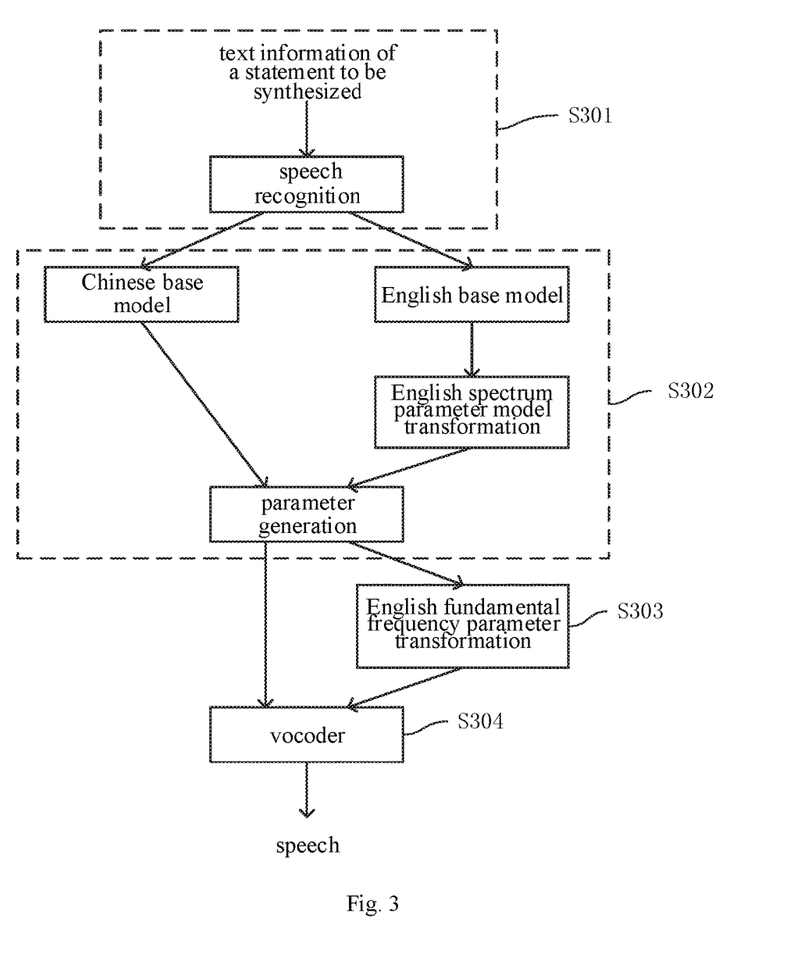
FIG. 3 is a schematic diagram illustrating a speech synthesis method according to an embodiment of the present disclosure.

As illustrated in FIG. 3, after obtaining the text information of the statement to be synthesized, sentence segmentation is performed on text content in the text information of the statement to be synthesized according to the characters of the language and context, and the language type of each sentence segment is determined (S301). Since the timbre needs to be adjusted to pronunciation of the Chinese speaker, the Chinese base model is directly used to perform parameter generation, and the English base model needs to be transformed. That is, before the parameter generation, taking that the English model is transformed to the timbre of the Chinese speaker as an example, English training speech data (such as English statements and annotations thereof) of the Chinese speaker is obtained and taken as input as a decision tree of the English spectrum parameter model in the English base model for clustering, to obtain the training data of each state, and the transformation matrix of the HMM state of each spectral parameter is estimated by using this data, such that the state Gaussian model after applying the transformation matrix may generate the spectrum parameter similar to the Chinese speaker for performing the parameter generation (S302). After parameter generation, the English training speech data (such as English statements and annotations thereof) of the Chinese speaker is taken as input of a decision tree of the English fundamental frequency parameter model in the English base model for clustering, to obtain the training data of each state, and the HMM state of each fundamental frequency is trained by this data, to obtain a Gaussian parameter of the HMM state, which is called the fundamental frequency model of the target speaker. During synthesis, parameter generation is performed by the fundamental frequency parameter model of the target speaker, and the global mean and the variance of the fundamental frequency carve generated are calculated and are saved. Then, fundamental frequency parameter generation is performed by the English base model, and linear transformation is performed on the fundamental frequency cave generated, to enable the global mean and the variance of this fundamental frequency cave to be transformed to be the same with the global mean and the variance of the fundamental frequency generated by the fundamental frequency model of the target speaker, finishing the transformation of the fundamental frequency carve (S303). Finally, speech synthesis is performed by the vocoder on the generated spectrum parameter corresponding to the Chinese statement text, the generated fundamental frequency parameter corresponding to the Chinese statement text, the spectrum parameter corresponding to the English statement text after adaption, the fundamental frequency parameter corresponding to the English statement text after adjusting, to obtain the mixing Chinese and English speech (S304).

In conclusion, the speech synthesis method provided in embodiments of the present disclosure synthesizes a speech with uniform timbre and standard pronunciation by not relying on certain standard multilingual speaker data, which may reduce the dependence of the professional multilingual speaker data in multilingual speech synthesis, and reduce the data cost and the implementation difficulty by using more monolingual data.

With the speech synthesis method provided in embodiments of the present disclosure, the language types included in the statement to be synthesized are determined, and then the adaptive training is performed on the second spectrum parameter model based on the target timbre when it is determined that the target timbre is the timbre of the trained speaker corresponding to the first base model. The first base model may be directly used to parameter generation without performing the adaptive training, and the spectrum parameter corresponding to the second language type is generated based on the second spectrum parameter model subjected to adaptive training. And the fundamental frequency parameter corresponding to the second language type generated is adjusted based on the target timbre, to adjust the timbre of the second language speaker to be the same or similar with the timbre of the first language speaker, which reduce the data cost and implementation difficulty in establishing the models and decrease the dependence of multilingual speech synthesis on the professional multilingual speaker data, and may effectively synthesize the multilingual statement text into natural, accurate and multilingual speech of uniform timbre, improving user experience.

Figure 4:
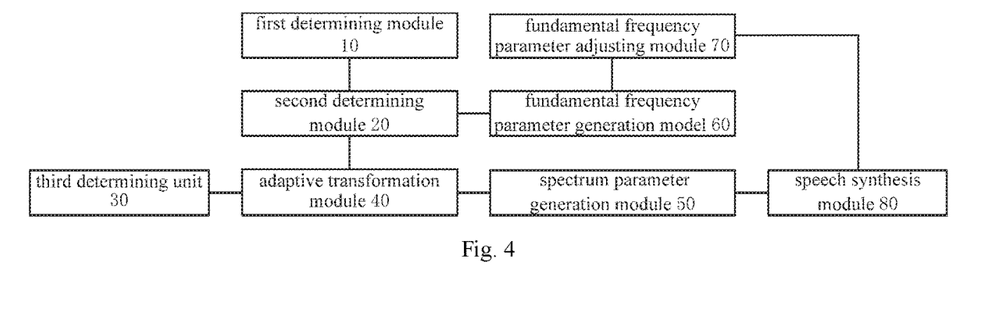
FIG. 4 is a block diagram illustrating a speech synthesis device according to an embodiment of the present disclosure.

Corresponding to the speech synthesis method provided in the above several embodiments, an embodiment of the present disclosure further provides a speech synthesis device. Since the speech synthesis device provided in embodiments of the present disclosure corresponds to the speech synthesis method provided in the above several embodiments, the implementation of the speech synthesis method above is further applicable to the speech synthesis device provided in embodiments, which is not described in detail in embodiments. FIG. 4 is a block diagram illustrating a speech synthesis device according to an embodiment of the present disclosure. As illustrated in FIG. 4, the speech synthesis device may include: a first determining module 10, a second determining module 20, a third determining module 30, an adaptive transformation module 40, a spectrum parameter generation module 50, a fundamental frequency parameter generation module 60, a fundamental frequency parameter adjusting module 70 and a speech synthesis module 80.

In detail, the first determining module 10 may be configured to determine language types of text information of a statement to be synthesized, in which, the language types include a first language type and a second language type.

The second determining module 20 may be configured to determine a first base model corresponding to the first language type and a second base model corresponding to the second language type, in which, the first base model includes a first spectrum parameter model and a first fundamental frequency parameter model, and the second base model includes a second spectrum parameter model and a second fundamental frequency parameter model.

Figure 5:
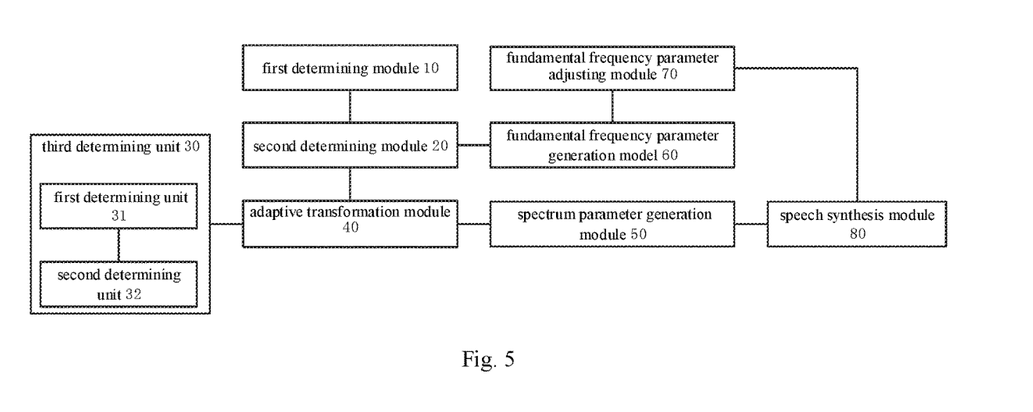
FIG. 5 is a block diagram illustrating a speech synthesis device according to a detailed embodiment of the present disclosure.

The third determining module 30 may be configured to determine a target timbre. In detail, in an embodiment of the present disclosure, as illustrated in FIG. 5, the third determining module 30 may include: a first determining unit 31 and a second determining unit 32. The first determining unit 31 is configured to obtain user information of a user, and determine a type of mother tongue of the user based on the user information, in which, the language type includes the type of mother tongue. The second determining unit 32 is configured to take a timbre of a trained speaker corresponding to a base model of the type of mother tongue of the user as the target timbre.

The adaptive transformation module 40 may be configured to perform adaptive transformation on the first spectrum parameter model and the second spectrum parameter model based on the target timbre.

The spectrum parameter generation module 50 may be configured to train the text information of the statement to be synthesized based on the first spectrum parameter model subjected to adaptive transformation and the second spectrum parameter model subjected to adaptive transformation to generate a spectrum parameter corresponding to the first language type and a spectrum parameter corresponding to the second language type.

The fundamental frequency parameter generation module 60 may be configured to train the text information of the statement to be synthesized based on the first fundamental frequency parameter model and the second fundamental frequency parameter model to generate a fundamental frequency parameter corresponding to the first language type and a fundamental frequency parameter corresponding to the second language type.

The fundamental frequency parameter adjusting module 70 may be configured to adjust the fundamental frequency parameter corresponding to the first language type and the fundamental frequency parameter corresponding to the second language type based on the target timbre.

The speech synthesis module 80 may be configured to synthesize the text information of the statement to be synthesized into a target speech based on the spectrum parameter corresponding to the first language type, the spectrum parameter corresponding to the second language type, the fundamental frequency parameter corresponding to the first language type after adjusting and the fundamental frequency parameter corresponding to the second language type after adjusting.

As an example, when the timbre is the timbre of the trained speaker corresponding to the first base model, the adaptive transformation module 40 is further configured to perform the adaptive transformation on the second spectrum parameter model based on the target timbre. The spectrum parameter generation model 50 is further configured to train a statement to be synthesized corresponding to the first language type in the text information of the statement to be synthesized based on the first spectrum parameter model, to generate the spectrum parameter corresponding to the first language type, and train a statement to be synthesized corresponding to the second language type in the text information of the statement to be synthesized based on the second spectrum parameter model subjected to adaptive transformation, to generate the spectrum parameter corresponding to the second language type. The fundamental frequency parameter adjusting model 70 is further configured to adjust the fundamental frequency parameter corresponding to the second language type based on the target timbre. The speech synthesis model 80 is further configured to synthesize the text information of the statement to be synthesized into the target speech based on the spectrum parameter corresponding to the first language type, the spectrum parameter corresponding to the second language type, the fundamental frequency parameter corresponding to the first language type and the fundamental frequency parameter corresponding to the second language type after adjusting.

Figure 6:
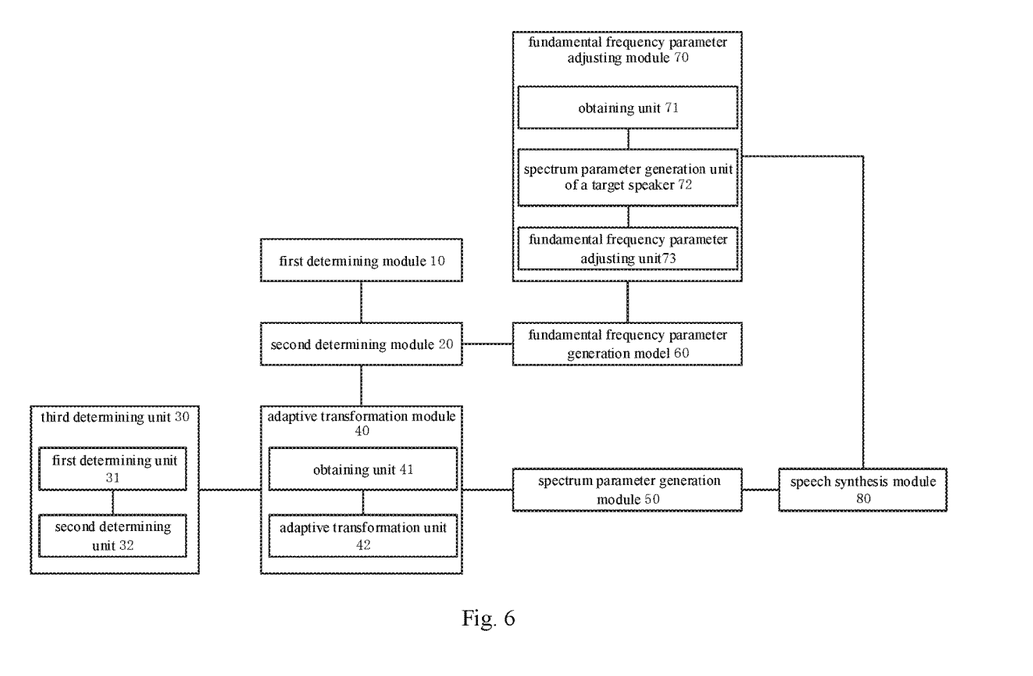
FIG. 6 is a block diagram illustrating a speech synthesis device according to another detailed embodiment of the present disclosure.

In embodiments, as illustrated in FIG. 6, the adaptive transformation module 40 may include: an obtaining unit 41 and an adaptive transformation unit 42. The obtaining unit 41 is configured to obtain training speech data of the trained speaker corresponding to the first base model for the second language type. The adaptive transformation unit 42 is configured to perform the adaptive transformation on the second spectrum parameter model based on the obtaining the training speech data of the trained speaker corresponding to the first base model for the second language type.

In embodiments, as illustrated in FIG. 6, the fundamental frequency adjusting model 70 may include: an obtaining unit 71, a fundamental frequency parameter generation unit 72 of a target speaker and a fundamental frequency parameter adjusting unit 73. The obtaining unit 71 is configured to obtain the training speech data of the trained speaker corresponding to the first base model for the second language type. The fundamental frequency parameter generation unit 72 of the target speaker is configured to train the second fundamental frequency parameter model based on the training speech data of the trained speaker corresponding to the first base model for the second language type, to generate the fundamental frequency parameter of the target speaker corresponding to the target timbre. The fundamental frequency parameter adjusting unit 73 is configured to adjust the fundamental frequency parameter corresponding to the second language type based on the fundamental frequency parameter of the target speaker.

With the speech synthesis device provided in embodiments of the present disclosure, language types included in the statement to be synthesized are determined, and the adaptive training is performed on the spectrum parameter of respective language type based on the target timbre, and the spectrum parameter corresponding to respective language type may be generated by employing the corresponding spectrum parameter model subjected to adaptive training, and the generated fundamental frequency parameter of respective language type is adjusted based on the target timbre, to obtain an uniform timbre multilingual speech. It should be understood that, the language base models used above are built by monolingual data, which reduce the data cost and implementation difficulty in establishing the models and decrease the dependence of multilingual speech synthesis on the professional multilingual speaker data, and may effectively synthesize the multilingual statement text into the natural, accurate and uniform timbre multilingual speech, improving user experience.

To achieve the foregoing embodiments, the present disclosure further provides a terminal, including: one or more processors, a memory and one or more programs. The one or more programs are stored in the memory, and when the one or more programs executed by the one or more processors, the one or more programs are configured to execute acts of:

In block S101', determining language types of text information of a statement to be synthesized, in which, the language types include a first language type and a second language type.

In block S102', determining a first base model corresponding to the first language type and a second base model corresponding to the second language type, in which, the first base model includes a first spectrum parameter model and a first fundamental frequency parameter model, and the second base model includes a second spectrum parameter model and a second fundamental frequency parameter model.

In block S103', determining a target timbre, performing adaptive transformation on the first spectrum parameter model and the second spectrum parameter model based on the target timbre, and training the text information of the statement to be synthesized based on the first spectrum parameter model subjected to adaptive transformation and the second spectrum parameter model subjected to adaptive transformation to generate a spectrum parameter corresponding to the first language type and a spectrum parameter corresponding to the second language type.

In block S104', training the text information of the statement to be synthesized based on the first fundamental frequency parameter model and the second fundamental frequency parameter model to generate a fundamental frequency parameter corresponding to the first language type and a fundamental frequency parameter corresponding to the second language type, and adjusting the fundamental frequency parameter corresponding to the first language type and the fundamental frequency parameter corresponding to the second language type based on the target timbre.

In block S105', synthesizing the text information of the statement to be synthesized into a target speech based on the spectrum parameter corresponding to the first language type, the spectrum parameter corresponding to the second language type, the fundamental frequency parameter corresponding to the first language type after adjusting and the fundamental frequency parameter corresponding to the second language type after adjusting.

To achieve the foregoing embodiments, the present disclosure further provides a storage medium. The storage medium is configured to store applications, and the applications are configured to execute the speech synthesis method according to any of the foregoing embodiments of the present disclosure In the description of the present disclosure, it should be understood that, the terms "first", "second" is only for description purpose, it cannot be understood as indicating or implying its relative importance or implying the number of indicated technology features. Thus, features defined as "first", "second" may explicitly or implicitly include at least one of the features. In the description of the present disclosure, "a plurality of" means at least two, such as two, three, unless specified otherwise.

In the description of the present disclosure, reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, without a contradiction, the different embodiments or examples and the features of the different embodiments or examples can be combined by those skilled in the art.

Any procedure or method described in the flow charts or described in any other way herein may be understood include one or more modules, portions or parts for executing instruction codes that implement steps of a custom logic function or procedure. And preferable embodiments of the present disclosure includes other implementation, in which the order of execution is different from that which is depicted or discussed, including executing functions in a substantially simultaneous manner or in an opposite order according to the related functions, which may be understood by the skilled in the art of embodiments of the present disclosure.

The logic and/or step described in other manners herein or shown in the flow chart, for example, a particular sequence table of executable instructions for realizing the logical function, may be specifically achieved in any computer readable medium to be used by the instruction execution system, device or equipment (such as a system based on computers, a system including processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples (non-exhaustive list) of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that, respective parts of the present disclosure may be implemented with hardware, software, firmware or a combination thereof. In the above implementations, a plurality of steps or methods may be implemented by software or firmware that is stored in the memory and executed by an appropriate instruction executing system. For example, if it is implemented by hardware, it may be implemented by any one of the following technologies known in the art or a combination thereof as in another embodiment: a discrete logic circuit(s) having logic gates for implementing logic functions upon data signals, an Application Specific Integrated Circuit (ASIC) having appropriate combinational logic gates, a Programmable Gate Array(s) (PGA), a Field Programmable Gate Array (FPGA), etc.

The common technical personnel in the field may understand that all or some steps in the above embodiments may be completed by the means that relevant hardware is instructed by a program. The program may be stored in a computer readable storage medium, and the program includes any one or combination of the steps in embodiments when being executed.

In addition, respective function units in respective embodiments of the present disclosure may be integrated in a processing unit, and respective unit may further exist physically alone, and two or more units may further be integrated in a unit. The foregoing integrated unit may be implemented either in the forms of hardware or software. If the integrated module is implemented as a software functional module and is sold or used as a stand-alone product, it may be stored in a computer readable storage medium.

The above-mentioned storage medium may be a read only memory, a magnetic disk or a disk and the like. Although embodiments of the present disclosure have been shown and described above. it should be understood that, the above embodiments are exemplary, and it would be appreciated by those skilled in the art that the above embodiments cannot be construed to limit the present disclosure, and changes, alternatives, and modifications can be made in the embodiments without departing from scope of the present disclosure.

What is claimed is:

1. A speech synthesis method performed by one or more computing device, and comprising:
    determining language types of text information of a statement to be synthesized, wherein, the language types comprise a first language type and a second language type;
    determining a first base model corresponding to the first language type and a second base model corresponding to the second language type, wherein, the first base model comprises a first spectrum parameter model and a first fundamental frequency parameter model, and the second base model comprises a second spectrum parameter model and a second fundamental frequency parameter model;
    determining a target timbre, performing adaptive transformation on the first spectrum parameter model and the second spectrum parameter model based on the target timbre, and training the text information of the statement to be synthesized based on the first spectrum parameter model subjected to adaptive transformation and the second spectrum parameter model subjected to adaptive transformation to generate a spectrum parameter corresponding to the first language type and a spectrum parameter corresponding to the second language type;
    training the text information of the statement to be synthesized based on the first fundamental frequency parameter model and the second fundamental frequency parameter model to generate a fundamental frequency parameter corresponding to the first language type and a fundamental frequency parameter corresponding to the second language type, and adjusting the fundamental frequency parameter corresponding to the first language type and the fundamental frequency parameter corresponding to the second language type based on the target timbre; and
    synthesizing the text information of the statement to be synthesized into a target speech based on the spectrum parameter corresponding to the first language type, the spectrum parameter corresponding to the second language type, the fundamental frequency parameter corresponding to the first language type after adjusting and the fundamental frequency parameter corresponding to the second language type after adjusting.

2. The method according to claim 1, wherein, determining the target timbre, comprises:
    obtaining user information of a user, and determining a type of mother tongue of the user based on the user information, wherein, the language type comprises the type of mother tongue;
    taking a timbre of a trained speaker corresponding to a base model of the type of mother tongue of the user as the target timbre.

3. The method according to claim 1 or 2, wherein, when the target timbre is a timbre of a trained speaker corresponding to the first base model,
    performing the adaptive transformation on the first spectrum parameter model and the second spectrum parameter model based on the target timbre, comprises:
    performing the adaptive transformation on the second spectrum parameter model based on the target timbre;
    training the text information of the statement to be synthesized based on the first spectrum parameter model subjected to adaptive transformation and the second spectrum parameter model subjected to adaptive transformation to generate a spectrum parameter corresponding to the first language type and a spectrum parameter corresponding to the second language type, comprises:
    training a statement to be synthesized corresponding to the first language type in the text information of the statement to be synthesized based on the first spectrum parameter model subjected to adaptive transformation to generate the spectrum parameter corresponding to the first language type, and training a statement to be synthesized corresponding to the second language type in the text information of the statement to be synthesized based on the second spectrum parameter model subjected to adaptive transformation to generate the spectrum parameter corresponding to the second language type;
    adjusting the fundamental frequency parameter corresponding to the first language type and the fundamental frequency parameter corresponding to the second language type based on the target timbre, comprises:
    adjusting the fundamental frequency parameter of the second language type based on the target timbre;

synthesizing the text information of the statement to be synthesized into a target speech based on the spectrum parameter corresponding to the first language type, the spectrum parameter corresponding to the second language type, the fundamental frequency parameter corresponding to the first language type after adjusting and the fundamental frequency parameter corresponding to the second language type after adjusting, comprises:

synthesizing the text information of the statement to be synthesized into the target speech based on the spectrum parameter corresponding to the first language type, the spectrum parameter corresponding to the second language type, the fundamental frequency parameter corresponding to the first language type and the fundamental frequency parameter corresponding to the second language type after adjusting.

4. The method according to claim 3, wherein, performing the adaptive transformation on the second spectrum parameter model based on the target timbre, comprises:

obtaining training speech data of the trained speaker corresponding to the first base model for the second language type; and performing the adaptive transformation on the second spectrum parameter model based on the training speech data of the trained speaker corresponding to the first base model for the second language type.

5. The method according to claim 3, wherein, adjusting the fundamental frequency parameters of the second language type based on the target timbre, comprises:

obtaining training speech data of the trained speaker corresponding to the first base model for the second language type;

training the second fundamental frequency parameter model based on the training speech data of the trained speaker corresponding to the first base model for the second language type, to generate a fundamental frequency parameter of a target people corresponding to the target timbre; and adjusting the fundamental frequency parameter corresponding to the second language type based on the fundamental frequency parameter of the target people.

6. The method according to claim 2, wherein, when the target timbre is a timbre of a trained speaker corresponding to the first base model, performing the adaptive transformation on the first spectrum parameter model and the second spectrum parameter model based on the target timbre, comprises:

performing the adaptive transformation on the second spectrum parameter model based on the target timbre, training the text information of the statement to be synthesized based on the first spectrum parameter model subjected to adaptive transformation and the second spectrum parameter model subjected to adaptive transformation to generate a spectrum parameter corresponding to the first language type and a spectrum parameter corresponding to the second language type, comprises:

training a statement to be synthesized corresponding to the first language type in the text information of the statement to be synthesized based on the first spectrum parameter model subjected to adaptive transformation to generate the spectrum parameter corresponding to the first language type, and training a statement corresponding to the second language type in the text information of the statement to be synthesized based on the second spectrum parameter model subjected to adaptive transformation to generate the spectrum parameter corresponding to the second language type;

adjusting the fundamental frequency parameter corresponding to the first language type and the fundamental frequency parameter corresponding to the second language type based on the target timbre, comprises:

adjusting the fundamental frequency parameter of the second language type based on the target timbre;

synthesizing the text information of the statement to be synthesized into a target speech based on the spectrum parameter corresponding to the first language type, the spectrum parameter corresponding to the second language type, the fundamental frequency parameter corresponding to the first language type after adjusting and the fundamental frequency parameter corresponding to the second language type after adjusting, comprises:

synthesizing the text information of the statement to be synthesized into the target speech based on the spectrum parameter corresponding to the first language type, the spectrum parameter corresponding to the second language type, the fundamental frequency parameter corresponding to the first language type and the fundamental frequency parameter corresponding to the second language type after adjusting.

7. A terminal, comprising:

one or more processors;

a memory;

one or more programs, stored in the memory, wherein when executed by the one or more processors, the one or more programs are configured to execute acts of:

determining language types of text information of a statement to be synthesized, wherein, the language types comprise a first language type and a second language type;

determining a first base model corresponding to the first language type and a second base model corresponding to the second language type, wherein, the first base model comprises a first spectrum parameter model and a first fundamental frequency parameter model, and the second base model comprises a second spectrum parameter model and a second fundamental frequency parameter model;

determining a target timbre, performing adaptive transformation on the first spectrum parameter model and the second spectrum parameter model based on the target timbre, and training the text information of the statement to be synthesized based on the first spectrum parameter model subjected to adaptive transformation and the second spectrum parameter model subjected to adaptive transformation to generate a spectrum parameter corresponding to the first language type and a spectrum parameter corresponding to the second language type;

training the text information of the statement to be synthesized based on the first fundamental frequency parameter model and the second fundamental frequency parameter model to generate a fundamental frequency parameter corresponding to the first language type and a fundamental frequency parameter corresponding to the second language type, and adjusting the fundamental frequency parameter corresponding to the first language type and the fundamental frequency parameter corresponding to the second language type based on the target timbre; and synthesizing the text information of the statement to be synthesized into a target speech based on the spectrum parameter corresponding to the first language type, the spectrum parameter corresponding to the second language type, the fundamental frequency parameter corresponding to the first language type after adjusting and the fundamental frequency parameter corresponding to the second language type after adjusting.

8. The terminal according to claim 7, wherein, determining the target timbre, comprises:
obtaining user information of a user, and determining a type of mother tongue of the user based on the user information, wherein, the language type comprises the type of mother tongue,
taking a timbre of a trained speaker corresponding to a base model of the type of mother tongue of the user as the target timbre.

9. The terminal according to claim 8, wherein, when the target timbre is a timbre of a trained speaker corresponding to the first base model,
performing the adaptive transformation on the first spectrum parameter model and the second spectrum parameter model based on the target timbre, comprises:
performing the adaptive transformation on the second spectrum parameter model based on the target timbre;
training the text information of the statement to be synthesized based on the first spectrum parameter model subjected to adaptive transformation and the second spectrum parameter model subjected to adaptive transformation to generate a spectrum parameter corresponding to the first language type and a spectrum parameter corresponding to the second language type, comprises:
training a statement to be synthesized corresponding to the first language type in the text information of the statement to be synthesized based on the first spectrum parameter model subjected to adaptive transformation to generate the spectrum parameter corresponding to the first language type, and training a statement to be synthesized corresponding to the second language type in the text information of the statement to be synthesized based on the second spectrum parameter model subjected to adaptive transformation to generate the spectrum parameter corresponding to the second language type;
adjusting the fundamental frequency parameter corresponding to the first language type and the fundamental frequency parameter corresponding to the second language type based on the target timbre, comprises:
adjusting the fundamental frequency parameter of the second language type based on the target timbre;
synthesizing the text information of the statement to be synthesized into a target speech based on the spectrum parameter corresponding to the first language type, the spectrum parameter corresponding to the second language type, the fundamental frequency parameter corresponding to the first language type after adjusting and the fundamental frequency parameter corresponding to the second language type after adjusting, comprises:
synthesizing the text information of the statement to be synthesized into the target speech based on the spectrum parameter corresponding to the first language type, the spectrum parameter corresponding to the second language type, the fundamental frequency parameter corresponding to the first language type and the fundamental frequency parameter corresponding to the second language type after adjusting.

10. The terminal according to claim 7, wherein, when the target timbre is a timbre of a trained speaker corresponding to the first base model,
performing the adaptive transformation on the first spectrum parameter model and the second spectrum parameter model based on the target timbre, comprises:
performing the adaptive transformation on the second spectrum parameter model based on the target timbre,
training the text information of the statement to be synthesized based on the first spectrum parameter model subjected to adaptive transformation and the second spectrum parameter model subjected to adaptive transformation to generate a spectrum parameter corresponding to the first language type and a spectrum parameter corresponding to the second language type, comprises:
training a statement to be synthesized corresponding to the first language type in the text information of the statement to be synthesized based on the first spectrum parameter model subjected to adaptive transformation to generate the spectrum parameter corresponding to the first language type, and training a statement to be synthesized corresponding to the second language type in the text information of the statement to be synthesized based on the second spectrum parameter model subjected to adaptive transformation to generate the spectrum parameter corresponding to the second language type;
adjusting the fundamental frequency parameter corresponding to the first language type and the fundamental frequency parameter corresponding to the second language type based on the target timbre, comprises:
adjusting the fundamental frequency parameter of the second language type based on the target timbre;
synthesizing the text information of the statement to be synthesized into a target speech based on the spectrum parameter corresponding to the first language type, the spectrum parameter corresponding to the second language type, the fundamental frequency parameter corresponding to the first language type after adjusting and the fundamental frequency parameter corresponding to the second language type after adjusting, comprises:
synthesizing the text information of the statement to be synthesized into the target speech based on the spectrum parameter corresponding to the first language type, the spectrum parameter corresponding to the second language type, the fundamental frequency parameter corresponding to the first language type and the fundamental frequency parameter corresponding to the second language type after adjusting.

11. The terminal according to claim 10, wherein, performing the adaptive transformation on the second spectrum parameter model based on the target timbre, comprises:
obtaining training speech data of the trained speaker corresponding to the first base model for the second language type; and
performing the adaptive transformation on the second spectrum parameter model based on the training speech data of the trained speaker corresponding to the first base model for the second language type.

12. The terminal according to claim 10, wherein, adjusting the fundamental frequency parameters of the second language type based on the target timbre, comprises:

obtaining training speech data of the trained speaker corresponding to the first base model for the second language type;

training the second fundamental frequency parameter model based on the training speech data of the trained speaker corresponding to the first base model for the second language type, to generate a fundamental frequency parameter of a target people corresponding to the target timbre, and adjusting the fundamental frequency parameter corresponding to the second language type based on the fundamental frequency parameter of the target people.

13. A non-transitory computer readable storage medium, configured to store applications, wherein, the applications are configured to execute a speech synthesis method, the method comprising:

determining language types of text information of a statement to be synthesized, wherein, the language types comprise a first language type and a second language type;

determining a first base model corresponding to the first language type and a second base model corresponding to the second language type, wherein, the first base model comprises a first spectrum parameter model and a first fundamental frequency parameter model, and the second base model comprises a second spectrum parameter model and a second fundamental frequency parameter model;

determining a target timbre, performing adaptive transformation on the first spectrum parameter model and the second spectrum parameter model based on the target timbre, and training the text information of the statement to be synthesized based on the first spectrum parameter model subjected to adaptive transformation and the second spectrum parameter model subjected to adaptive transformation to generate a spectrum parameter corresponding to the first language type and a spectrum parameter corresponding to the second language type;

training the text information of the statement to be synthesized based on the first fundamental frequency parameter model and the second fundamental frequency parameter model to generate a fundamental frequency parameter corresponding to the first language type and a fundamental frequency parameter corresponding to the second language type, and adjusting the fundamental frequency parameter corresponding to the first language type and the fundamental frequency parameter corresponding to the second language type based on the target timbre; and synthesizing the text information of the statement to be synthesized into a target speech based on the spectrum parameter corresponding to the first language type, the spectrum parameter corresponding to the second language type, the fundamental frequency parameter corresponding to the first language type after adjusting and the fundamental frequency parameter corresponding to the second language type after adjusting.

14. The non-transitory computer readable storage medium according to claim 13, wherein, determining the target timbre, comprises:

obtaining user information of a user, and determining a type of mother tongue of the user based on the user information, wherein, the language type comprises the type of mother tongue;

taking a timbre of a trained speaker corresponding to a base model of the type of mother tongue of the user as the target timbre.

15. The non-transitory computer readable storage medium according to claim 14, wherein, when the target timbre is a timbre of a trained speaker corresponding to the first base model, performing the adaptive transformation on the first spectrum parameter model and the second spectrum parameter model based on the target timbre, comprises:

performing the adaptive transformation on the second spectrum parameter model based on the target timbre;

training the text information of the statement to be synthesized based on the first spectrum parameter model subjected to adaptive transformation and the second spectrum parameter model subjected to adaptive transformation to generate a spectrum parameter corresponding to the first language type and a spectrum parameter corresponding to the second language type, comprises:

training a statement to be synthesized corresponding to the first language type in the text information of the statement to be synthesized based on the first spectrum parameter model subjected to adaptive transformation to generate the spectrum parameter corresponding to the first language type, and training a statement to be synthesized corresponding to the second language type in the text information of the statement to be synthesized based on the second spectrum parameter model subjected to adaptive transformation to generate the spectrum parameter corresponding to the second language type;

adjusting the fundamental frequency parameter corresponding to the first language type and the fundamental frequency parameter corresponding to the second language type based on the target timbre, comprises:

adjusting the fundamental frequency parameter of the second language type based on the target timbre;

synthesizing the text information of the statement to be synthesized into a target speech based on the spectrum parameter corresponding to the first language type, the spectrum parameter corresponding to the second language type, the fundamental frequency parameter corresponding to the first language type after adjusting and the fundamental frequency parameter corresponding to the second language type after adjusting, comprises:

synthesizing the text information of the statement to be synthesized into the target speech based on the spectrum parameter corresponding to the first language type, the spectrum parameter corresponding to the second language type, the fundamental frequency parameter corresponding to the first language type and the fundamental frequency parameter corresponding to the second language type after adjusting.

16. The non-transitory computer readable storage medium according to claim 13, wherein, when the target timbre is a timbre of a trained speaker corresponding to the first base model, performing the adaptive transformation on the first spectrum parameter model and the second spectrum parameter model based on the target timbre, comprises:

performing the adaptive transformation on the second spectrum parameter model based on the target timbre;

training the text information of the statement to be synthesized based on the first spectrum parameter model subjected to adaptive transformation and the second spectrum parameter model subjected to adaptive transformation to generate a spectrum parameter corresponding to the first language type and a spectrum parameter corresponding to the second language type, comprises:

training a statement to be synthesized corresponding to the first language type in the text information of the statement to be synthesized based on the first spectrum parameter model subjected to adaptive transformation to generate the spectrum parameter corresponding to the first language type, and training a statement to be synthesized corresponding to the second language type in the text information of the statement to be synthesized based on the second spectrum parameter model subjected to adaptive transformation to generate the spectrum parameter corresponding to the second language type;

adjusting the fundamental frequency parameter corresponding to the first language type and the fundamental frequency parameter corresponding to the second language type based on the target timbre, comprises:

adjusting the fundamental frequency parameter of the second language type based on the target timbre, synthesizing the text information of the statement to be synthesized into a target speech based on the spectrum parameter corresponding to the first language type, the spectrum parameter corresponding to the second language type, the fundamental frequency parameter corresponding to the first language type after adjusting and the fundamental frequency parameter corresponding to the second language type after adjusting, comprises:

synthesizing the text information of the statement to be synthesized into the target speech based on the spectrum parameter corresponding to the first language type, the spectrum parameter corresponding to the second language type, the fundamental frequency parameter corresponding to the first language type and the fundamental frequency parameter corresponding to the second language type after adjusting.

17. The non-transitory computer readable storage medium according to claim 16, wherein, performing the adaptive transformation on the second spectrum parameter model based on the target timbre, comprises:

obtaining training speech data of the trained speaker corresponding to the first base model for the second language type; and performing the adaptive transformation on the second spectrum parameter model based on the training speech data of the trained speaker corresponding to the first base model for the second language type.

18. The non-transitory computer readable storage medium according to claim 16, wherein, adjusting the fundamental frequency parameters of the second language type based on the target timbre, comprises:

obtaining training speech data of the trained speaker corresponding to the first base model for the second language type;

training the second fundamental frequency parameter model based on the training speech data of the trained speaker corresponding to the first base model for the second language type, to generate a fundamental frequency parameter of a target people corresponding to the target timbre; and adjusting the fundamental frequency parameter corresponding to the second language type based on the fundamental frequency parameter of the target people.

* * * * *